(12) United States Patent
Maeda

(10) Patent No.: US 10,530,154 B2
(45) Date of Patent: Jan. 7, 2020

(54) CONTROL APPARATUS

(71) Applicant: DAIKIN INDUSTRIES, LTD., Osaka-shi, Osaka (JP)

(72) Inventor: Chikara Maeda, Kusatsu (JP)

(73) Assignee: Daikin Industries, Ltd., Osaka (JP)

( * ) Notice: Subject to any disclaimer, the term of this patent is extended or adjusted under 35 U.S.C. 154(b) by 150 days.

(21) Appl. No.: 14/914,605

(22) PCT Filed: Jul. 2, 2014

(86) PCT No.: PCT/JP2014/067624
§ 371 (c)(1),
(2) Date: Feb. 25, 2016

(87) PCT Pub. No.: WO2015/029586
PCT Pub. Date: Mar. 5, 2015

(65) Prior Publication Data
US 2016/0218507 A1 Jul. 28, 2016

(30) Foreign Application Priority Data
Aug. 28, 2013 (JP) ................................. 2013-176638

(51) Int. Cl.
*H02J 3/14* (2006.01)
*G05B 13/02* (2006.01)
*H02J 3/38* (2006.01)

(52) U.S. Cl.
CPC ............ *H02J 3/14* (2013.01); *G05B 13/0205* (2013.01); *H02J 3/383* (2013.01)

(58) Field of Classification Search
CPC .... H02J 3/14; H02J 3/008; H02J 3/383; H02J 3/0006; G05B 13/0205
(Continued)

(56) References Cited

U.S. PATENT DOCUMENTS

2011/0172841 A1 7/2011 Forbes, Jr.
2012/0326505 A1* 12/2012 Otsuki .................... H02J 3/28
307/31

(Continued)

FOREIGN PATENT DOCUMENTS

EP 2 667 473 A1 11/2013
JP 2008-104310 A 5/2008
(Continued)

OTHER PUBLICATIONS

International Search Report of corresponding PCT Application No. PCT/JP2014/067624 dated Aug. 19, 2014.
(Continued)

*Primary Examiner* — Mohammad Ali
*Assistant Examiner* — Joshua T Sanders
(74) *Attorney, Agent, or Firm* — Global IP Counselors, LLP

(57) ABSTRACT

A control apparatus includes a receiving unit, a demand response unit, a power consumption fluctuation unit, a fluctuation-amount-estimation unit and an adjustment control execution unit. The receiving unit receives a demand pertaining to power consumption sent from an energy management apparatus. The demand response unit executes a demand-response control in order to adjust total power consumption of a plurality of devices set up in a property in accordance with the demand. The power consumption fluctuation unit executes a non-demand-response control in order to cause total power consumption to fluctuate regardless of the demand. The fluctuation-amount-estimation unit estimates a power consumption that will fluctuate due to the non-demand-response control during the demand-response control. The adjustment control execution unit executes an adjustment control in order to adjust power consumption of any facility device based on an amount of fluctuation in (Continued)

power consumption as estimated by the fluctuation-amount-estimation unit.

10 Claims, 9 Drawing Sheets

(58) Field of Classification Search
USPC .................................................. 700/291
See application file for complete search history.

(56) References Cited

U.S. PATENT DOCUMENTS

2013/0090777 A1 4/2013 Lu et al.
2014/0327309 A1 11/2014 Takahashi et al.
2015/0046222 A1* 2/2015 Ishii ...................... G06Q 50/06
705/7.31

FOREIGN PATENT DOCUMENTS

| JP | 2012-38295 A | 2/2012 |
| JP | 2013-132153 A | 7/2013 |
| WO | 2013/008934 A1 | 1/2013 |
| WO | 2013/080308 A1 | 6/2013 |

OTHER PUBLICATIONS

European Search Report of corresponding EP Application No. 14 84 0764.6 dated Mar. 7, 2017.
International Preliminary Report of corresponding PCT Application No. PCT/JP2014/067624 dated Mar. 10, 2016.

* cited by examiner

| TYPE OF DEVICE | RESPONSE SPEED |
|---|---|
| AIR CONDITIONER 1 | xx kwh/sec |
| AIR CONDITIONER 2 | xx kwh/sec |
| LIGHT 1 | xx kwh/sec |
| LIGHT 2 | xx kwh/sec |
| VENTILATION FAN 1 | xx kwh/sec |
| VENTILATION FAN 2 | xx kwh/sec |
| ... | ... |

FIG. 4

CONTROL APPARATUS

CROSS-REFERENCE TO RELATED APPLICATIONS

This U.S. National stage application claims priority under 35 U.S.C. § 119(a) to Japanese Patent Application No. 2013-176638, filed in Japan on Aug. 28, 2013, the entire contents of which are hereby incorporated herein by reference.

TECHNICAL FIELD

The present invention relates to a control apparatus.

BACKGROUND ART

In the past, demand-response control has been performed for controlling facility devices located on a property, in response to a demand sent from a power company, as is shown in Japanese Laid-open Patent Application No. 2012-38295. The demand sent from the power company includes conditions relating to the target power consumption and to the time period (a predetermined time period) the target power consumption will be maintained. When a demand is received on the property, demand-response control of the facility devices is started in response to the demand. During the predetermined time period, when demand-response control is executed and the power consumption of the facility devices is maintained at the target power consumption, the property is given a predetermined incentive from the power company.

SUMMARY

Technical Problem

The facility devices are typically used in order to make the environment of the property more comfortable. The facility devices are also used with energy conservation taken into account. Specifically, the facility devices can be controlled under conditions desired by the user and/or conditions accounting for energy conservation, regardless of demand. When control regardless of demand is performed during demand-response control, there are cases in which the target power consumption stipulated by the demand cannot be achieved. The predetermined incentive is thereby not obtained, and as a result, it is difficult to control the facility devices effectively.

In view of this, an object of the present invention is to provide a control apparatus that makes effective control of facility devices possible during demand-response control.

Solution to Problem

A control apparatus according to a first aspect of the present invention comprises a receiving unit, a demand response unit, a power consumption fluctuation unit, a fluctuation-amount-estimation unit, and an adjustment control execution unit. The receiving unit receives a demand pertaining to power consumption from an energy management apparatus. The demand response unit executes demand-response control in accordance with the demand, when the demand is received by the receiving unit. Demand-response control involves adjusting the total power consumption of a plurality of facility devices set up in a property. The power consumption fluctuation unit executes non-demand-response control. Non-demand-response control involves causing the total power consumption to fluctuate regardless of the demand. The fluctuation-amount-estimation unit estimates the power consumption that will fluctuate due to the non-demand-response control during the demand-response control. The adjustment control execution unit executes adjustment control. Adjustment control involves adjusting the power consumption of any facility device among the plurality of facility devices, on the basis of the estimated fluctuation amount. The estimated fluctuation amount is the amount of fluctuation in power consumption as estimated by the fluctuation-amount-estimation unit.

In this control apparatus, the power consumption that will be made to fluctuate by non-demand-response control during the execution of demand-response control is estimated. The power consumption of any facility device among the plurality of facility devices is also adjusted on the basis of the estimated fluctuating power consumption (estimated fluctuation amount). The facility devices can thereby be effectively controlled under demand-response control as well.

A control apparatus according to a second aspect of the present invention is the control apparatus according to the first aspect, further comprising a storage unit. The storage unit stores power fluctuation characteristics of each of the plurality of facility devices. The adjustment control execution unit executes adjustment control on any facility device among the plurality of facility devices on the basis of the power fluctuation characteristics.

In this control apparatus, power fluctuation characteristics for each of the plurality of facility devices are stored. The adjustment control execution unit executes adjustment control on any facility device among the plurality of facility devices on the basis of the power fluctuation characteristics. It is thereby possible to suitably adapt to fluctuation in power consumption during demand-response control.

A control apparatus according to a third aspect of the present invention is the control apparatus according to the first or second aspect, wherein the adjustment control execution unit executes the adjustment control with a time difference on some facility devices among the plurality of facility devices.

When adjustment control is executed in this control apparatus, adjustment control is executed on some facility devices among the plurality of facility devices no that the facility devices are driven with a time difference. The power consumption of other facility devices can thereby be suitably adjusted in conformity with the power consumption made to gradually fluctuate by non-demand-response control.

A control apparatus according to a fourth aspect of the present invention is the control apparatus according to any of the first through third aspects, wherein the non-demand-response control includes at least one of schedule control, manual control, and energy conservation control, which is based on either the presence/absence of humans or the amount of solar radiation in the spaces where the facility devices are set up.

In this control apparatus, at least one of schedule control, manual control, and energy conservation control is executed as non-demand-response control. The facility devices can thereby be controlled in a manner suited to the situation of the spaces.

Advantageous Effects of Invention

In the control apparatus according to the first aspect of the present invention, the facility devices can be effectively controlled under demand-response control.

In the control apparatus according to the second aspect of the present invention, it is possible to suitably adapt to fluctuations in power consumption during demand-response control.

In the control apparatus according to the third aspect of the present invention, the power consumption of other facility devices can be suitably adjusted in conformity with the power consumption made to gradually fluctuate by non-demand-response control.

In the control apparatus according to the fourth aspect of the present invention, the facility devices can be controlled in a manner suited to the situation of the spaces.

BRIEF DESCRIPTION OF THE DRAWINGS

FIG. 4 is a drawing showing an example of the information stored as power fluctuation characteristics.

DESCRIPTION OF EMBODIMENTS

An energy management system 100 according to the present embodiment is described below, using FIGS. 1 through 10.

(1) Overall Configuration of Energy Management System

Figure 1:
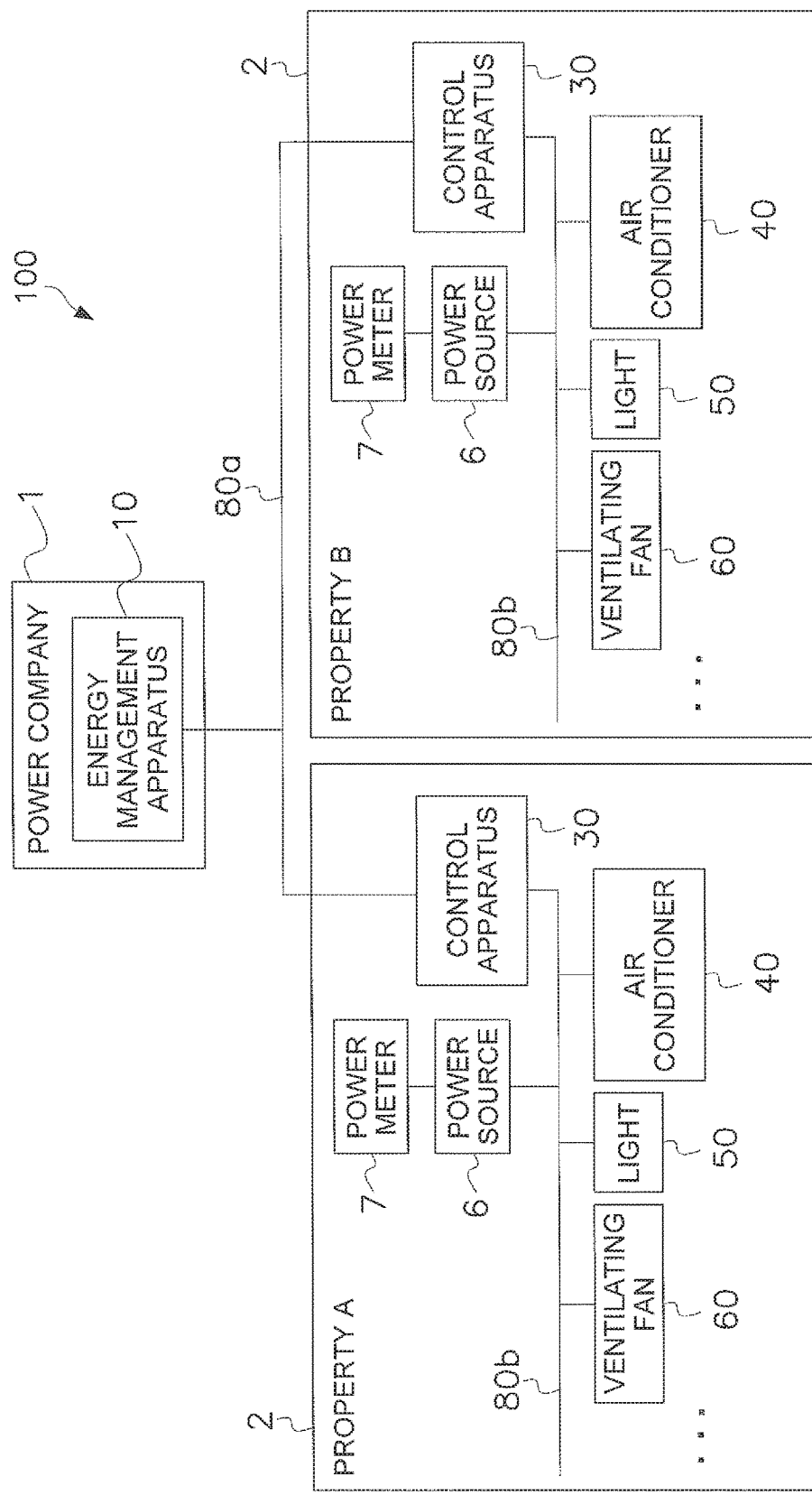
FIG. 1 is a schematic configuration view of the overall system according to an embodiment of the present invention.

FIG. 1 shows the energy management system 100 according to the present embodiment. The energy management system 100 is a system whereby a power company 1 manages the power consumption of a property 2.

In the energy management system 100, power is supplied from the power company 1 to a plurality of properties 2, 2. Each property 2 is a building in which a plurality of facility devices 40 to 60 are installed. For example, the properties 2 could be office buildings, tenant buildings, factories, common residences, and the like. In FIG. 1, two properties A, B are shown as properties 2 to which the power company 1 supplies power, but the number of properties is not limited to two. Specifically, the number of properties may be one, or may be three or more.

The power company 1 has an energy management apparatus 10. The properties 2 each have a control apparatus 30, a plurality of facility devices 40 to 60, a power source 6, and a power meter 7. The properties 2 also each have a human detection sensor (not shown) in the space where the facility devices 40 to 60 are installed. The power source 6 supplies power to the facility devices 40 to 60. The power meter 7 measures the amount of power supplied from the power source 6 to the facility devices 40 to 60. In the properties 2, the control apparatus 30 and the facility devices 40 to 60 are connected via a dedicated control line 80b. The facility devices 40 to 60 include an air conditioner 40, a light 50, and a ventilating fan 60. The air conditioner 40 may be multiple air conditioners or a pair of air conditioners. In the present embodiment, one air conditioner 40, light 50, and ventilating fan 60 each are shown in each of the properties A, B in order to simplify the description, but the facility devices 40 to 60 installed in the properties A, B are provided by way of any such limitation. The type and/or number of facility devices installed in the property A may be different from the type and/or number of facility devices installed in the property B.

The energy management apparatus 10 set up at the power company 1 and the control apparatuses 30 set up at the properties 2 are connected via the internet 80a. The energy management apparatus 10 is an apparatus whereby the power company 1 manages the amount of power consumed by the properties 2. The control apparatuses 30 are apparatuses for controlling the facility devices 40 to 60 installed in the properties 2.

The power company 1 makes contracts pertaining to demand-response control with the properties 2. Demand-response control involves control of the facility devices 40 to 60 performed by the properties 2 (the control apparatuses 30) in compliance with the demand sent from the power company 1 (the energy management apparatus 10). The demand includes, e.g., conditions pertaining to power consumption and the time span (adjustment time span) during which demand-response control is executed. Specifically, a power consumption target value (target power consumption) of kw/h during a predetermined time span (e.g., one hour starting at 11:00 am) is stipulated in the demand.

Under the contract pertaining to demand-response control (the demand-response contract), power (an amount of power) complying with the demand is consumed in the properties 2, and the power company 1 thereby pays out a predetermined incentive (e.g., a fee or a discount) to the properties 2. Specifically, the properties 2 receive a predetermined incentive when power coinciding with the target power consumption is continuously consumed during the adjustment time span defined in the demand.

Also under the demand-response contract, when power complying with the demand is not consumed in the properties 2, a predetermined penalty, such as, e.g., an additional fee or a forfeit payment, is imposed on the properties 2. Specifically, a penalty is imposed when the properties 2 do not continuously consume power coinciding with the target power consumption during the adjustment time span.

In other words, when the properties 2 uphold the demand-response contract, a predetermined incentive from the power company 1 is given, and when the properties do not comply with the demand-response contract, a predetermined penalty is imposed.

The energy management apparatus 10 and the control apparatuses 30 included in the energy management system 100 are described below.

(2) Configuration of Energy Management Apparatus

Figure 2:
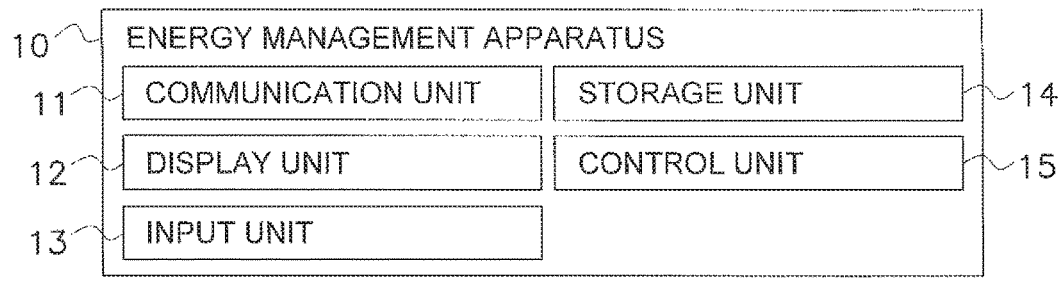
FIG. 2 is a schematic configuration view of the management apparatus according to the embodiment of the present invention.

FIG. 2 shows a schematic configuration view of the energy management apparatus 10. The energy management apparatus 10 is an apparatus for managing the amount of power consumed by the properties 2 in the power company 1, as described above. The energy management apparatus 10 comprises a communication unit 11, a display unit 12, an input unit 13, a storage unit 14, and a control unit 15.

(2-1) Communication Unit

The communication unit 11 is a network interface that enables the energy management apparatus 10 to be connected to the internet 80a.

(2-2) Display Unit

The display unit 12 is configured primarily from a display.

(2-3) Input Unit

The input unit 13 is configured primarily from operation buttons, a keyboard, a mouse, and the like.

(2-4) Storage Unit

The storage unit 14 is configured primarily from a hard disk. The demand transmitted to the properties 2 (the control apparatuses 30) is stored in the storage unit 14 for each property 2. Also stored in the storage unit 14 are various programs needed to manage the amount of power consumed by the properties (2-5) Control Unit The control unit 15 is configured primarily from a CPU, ROM, and RAM. The control unit 15 manages the amount of power consumed by the properties 2 by reading and executing the aforementioned programs stored in the storage unit 14.

(3) Configuration of Control Apparatus

Figure 3:
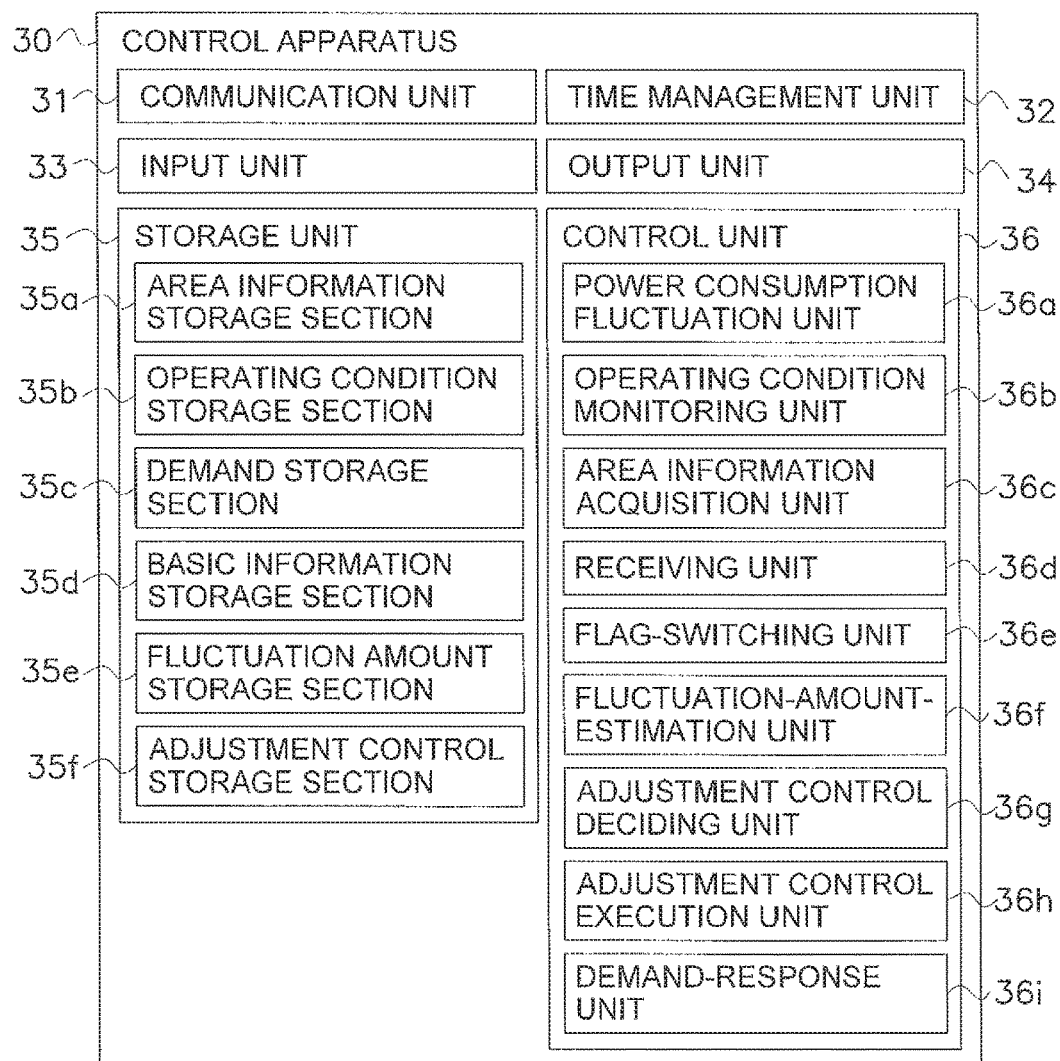
FIG. 3 is a schematic configuration view of a control apparatus according to the embodiment of the present invention.

FIG. 3 shows a schematic configuration view of a control apparatus 30. The control apparatuses 30 are apparatuses for controlling the facility devices 40 to 60 installed in the properties 2, as described above. Each control apparatus 30 comprises a communication unit 31, a time management unit 32, an input unit 33, an output unit 34, a storage unit 35, and a control unit 36.

(3-1) Communication Unit

The communication unit 31 is a network interface that enables the control apparatus 30 to connect to the internet 80a. Two-way communication between the control apparatus 30 and the energy management apparatus 10 is conducted by the communication unit 31 via the internet 80a. The communication unit 31 is also an interface that enables the control apparatus 30 to connect to the dedicated control line 80b.

(3-2) Time Management Unit

The time management unit 32 includes a timer that approximately synchronizes with the energy management apparatus 10 set up in the power company 1. The time management unit 32 performs time management of the various controls executed by the control apparatus 30.

(3-3) Input Unit

The input unit 33 is configured primarily from operation buttons and a touch panel covering a display which is described hereinafter. Various commands from the user to the facility devices 40 to 60, such as signals for starting and stopping the facility devices 40 to 60, changes to the settings, and changes to the operating mode, are inputted to the input unit 33.

(3-4) Output Unit

The output unit 34 is configured primarily from a display. A screen showing the operating conditions of the facility devices 40 to 60 is displayed on the output unit 34. The operating conditions include, e.g., the ON/OFF states of the facility devices 40 to 60, the operating modes (air-cooling mode/air-heating mode), intake temperature, set temperature, illuminance, ventilation amount, drive time, operating capability (%) during driving, and the like.

The output unit 34 outputs the current power consumption and the specifics of the demand to the display. The current power consumption includes the power consumption of each of the facility devices 40 to 60, and the total power consumption which is the total power consumption of all the facility devices 40 to 60 together. Furthermore, the output unit 34 also outputs to the display various information stored in the storage unit 35, the results of the various programs executed by the control unit 36, and the like.

(3-5) Storage Unit

The storage unit 35 is configured primarily from a hard disk. The storage unit 35 stores programs that can be read and executed by the control unit 36, described hereinafter. The storage unit 35 also includes an area information storage section 35a, an operating condition storage section 35b, a demand storage section 35c, a basic information storage section 35d, a fluctuation amount storage section 35e, and an adjustment control storage section 35f.

(3-5-1) Area Information Storage Section

The area information storage section 35a stores information on the spaces in the property 2 (area information). The area information includes information on human presence/absence. Specifically, the area information storage section 35a stores detection results from a human detection sensor. The area information is acquired by an area information acquisition unit 36c, described hereinafter. The area information storage section 35a associates and stores a human detection sensor set up in each space of the property 2 and information (presence/absence) obtained by the human detection sensor.

(3-5-2) Operating Condition Storage Section

The operating condition storage section 35b stores information pertaining to operating conditions monitored by an operating condition monitoring unit 36b, described hereinafter. The information pertaining to operating conditions includes information pertaining to the ON/OFF states of the facility devices 40 to 60, the operating modes (air-cooling mode/air-heating mode), intake temperature, set temperature, illuminance, ventilation amount, running time, running rate, operating capability (%) during running, and the like, as described above.

The information pertaining to operating conditions also includes information pertaining to the power consumption measured by the power meter 7.

(3-5-3) Demand Storage Section

The demand storage section 35c stores the demand sent from the energy management apparatus 10. Specifically, the demand storage section 35c stores the time span during which power consumption is adjusted (the adjustment time span) and the target power consumption tw.

Specifically, information pertaining to the starting time and ending time of the adjustment time span is stored as the adjustment time span. The target power consumption tw is the power (amount) that can be consumed per unit time, or the power (amount) that should be consumed per unit time. The target power consumption tw is a value allowed to have deviation, with one specific value as a reference. In other words, the range of power (amount) that can be consumed or that should be consumed is stipulated as the target power consumption tw in the demand. Specifically, in demand-response control, the facility devices 40 to 60 are controlled so that the consumed power reaches a value within the range stipulated as the target power consumption tw during the time span stipulated in the demand.

(3-5-4) Basic Information Storage Section

The basic information storage section 35d stores basic information on the facility devices 40 to 60 installed in the property 2. The basic information herein includes the type and number of facility devices 40 to 60 installed in the property 2, the power consumption per unit time according to the operating capabilities of the facility devices 40 to 60, the power fluctuation characteristics of the facility devices 40 to 60, and the like.

The power fluctuation characteristic is the time needed for driving/stopping (start/stop timing). In other words, the power fluctuation characteristic is the response speed (kwh/sec) when the settings of the facility devices 40 to 60 have been changed. For example, the basic information storage section 35d stores the amounts of change in power consumption per unit time, as shown in FIG. 4, as the response speeds of the facility devices 40 to 60.

The basic information also includes association information whereby the space in the property 2 is associated with the human detection sensor and the facility devices 40 to 60 installed in the space.

The basic information may also include priority order pertaining to the facility devices 40 to 60. Priority order herein is the order of the facility devices 40 to 60 for which the operating state prior to demand-response control is to be maintained when demand-response control is executed.

(3-5-5) Fluctuation Amount Storage Section

The fluctuation amount storage section 35e stores the fluctuation amount in power consumption estimated by a fluctuation-amount-estimation unit 361', described hereinafter. The fluctuation amount includes the progress of fluctuating power consumption when non-demand-response control is implemented, and the difference (power consumption difference) between the power consumption prior to non-demand-response control being executed and the power consumption after non-demand-response control is executed.

(3-5-6) Adjustment Control Storage Section

The adjustment control storage section 35f stores information pertaining to adjustment control decided by an adjustment control deciding unit 36g, described hereinafter. The information pertaining to adjustment control is information pertaining to control for compensating for the fluctuation in power consumption caused by non-demand-response control in the adjustment time span. Information pertaining to factors correlated with non-demand-response control executed in the adjustment time span, such as the types of facility devices 40 to 60 being driven, the timing at which the facility devices 40 to 60 are driven, the drive time, and operating capability (%) during driving, is stored as the information pertaining to adjustment control.

(3-6) Control Unit

The control unit 36 is configured primarily from a CPU, ROM, and RAM. By reading and executing the aforementioned programs stored in the storage unit 35, the control unit 36 functions primarily as a power consumption fluctuation unit 36a, an operating condition monitoring unit 36b, an area information acquisition unit 36c, a receiving unit 36d, a flag-switching unit 36e, a fluctuation-amount-estimation unit 36f, an adjustment control deciding unit 36g, an adjustment control execution unit 36h, and a demand-response unit 36i, as shown in FIG. 3.

(3-6-1) Power Consumption Fluctuation Unit

The power consumption fluctuation unit 36a executes control for increasing or reducing the power consumption of the facility devices 40 to 60 (non-demand-response control), regardless of the demand. Non-demand-response control includes controls such as energy conservation control, schedule control, and manual control.

Energy conservation control is control based on the aforementioned information stored in the area information storage section 35a. Specifically, energy conservation control is control based on human presence/absence in the spaces in the property 2. In energy conservation control, for example, the facility devices 40 to 60 are set to OFF in spaces where the human detection sensors detect absence. When energy conservation control is implemented outside of the adjustment time span, the timing at which the facility devices 40 to 60 are set to OFF can be set as desired.

Schedule control is control of the facility devices 40 to 60 that follows a schedule. The schedule is a plan pertaining to the timing of setting the facility devices 40 to 60 to ON/OFF, and/or the operation specifics (set temperature, airflow quantity, illuminance, etc.) when the facility devices 40 to 60 are set to ON. In the schedule, the facility devices 40 to 60 are controlled on the basis of a schedule in which a twenty-four hour block is divided into any number of time spans and the control specifics in each time span have been established in advance. The schedule is stored in the storage unit 35.

Furthermore, manual control means that the facility devices 40 to 60 are controlled according to user preferences.

The power consumption fluctuation unit 36a increases or reduces the power consumption of the facility devices 40 to 60 on the basis of a command inputted to the input unit 33, a command generated by the operating condition monitoring unit 36b, and a command based on the schedule.

The power consumption fluctuation unit 36a controls the facility devices 40 to 60 on the basis of the various commands only in predetermined cases, when a flag is set by the flag-switching unit 36e, described hereinafter. Such predetermined cases occur after an estimation result has been given by the fluctuation-amount-estimation unit 36f described hereinafter and adjustment control has been decided by the adjustment control deciding unit 36g described hereinafter. When a flag has been set by the flag-switching unit 36e, the result of estimating the fluctuation amount is given, and as long as the specifics of adjustment control have not been decided, non-demand-response control is not executed.

(3-6-2) Operating Condition Monitoring Unit

The operating condition monitoring unit 36b monitors the operating conditions of the facility devices 40 to 60. The operating conditions of the facility devices 40 to 60 includes information pertaining to the ON/OFF states of the facility devices 40 to 60, the operating modes (air-cooling mode/air-heating mode), intake temperature, set temperature, illuminance, ventilation amount, drive time, drive rate, operating capability (%) during driving, and the like, as described above. The information pertaining to the operating conditions also includes information pertaining to power consumption measured by the power meter 7. The operating capability (%) herein means how great of a capability the air conditioner 40 is actuating, relative to the rated capability of the air conditioner 40.

The operating condition monitoring unit 36b receives the time submitted by the time management unit 32, communicates with the facility devices 40 to 60 and the power meter 7 at predetermined time intervals to monitor the operating conditions, and acquires various information. The operating condition monitoring unit 36b monitors the operating conditions of the facility devices 40 to 60 at predetermined time intervals even after the start of demand-response control. The various information acquired by the operating condition monitoring unit 36b is stored in the aforementioned operating condition storage section 35b along with the date and time the information was acquired.

When the demand is received by the receiving unit 36d described hereinafter, the operating condition monitoring unit 36b monitors the operating conditions of the facility devices 40 to 60 and the obtained information is stored in the operating condition storage section 35h, regardless of the predetermined time intervals. Specifically, the operating condition monitoring unit 36b monitors the operating conditions of the facility devices 40 to 60 immediately before the start of demand-response control and acquires the information of the facility devices 40 to 60 at the timing at which the demand was received.

The operating condition monitoring unit 36b confirms whether or not energy conservation control needs to be executed. Specifically, the operating condition monitoring unit 36b confirms whether or not energy conservation control needs to be executed on the basis of the information stored in the area information storage section 35a and the information stored in the operating condition storage section 35b. More specifically, the operating condition monitoring unit 36b confirms whether or not there are any number of facility devices 40 to 60 in spaces where an absence is detected by the human detection sensors, and whether or not these facility devices 40 to 60 are being driven. Upon confirming there are facility devices 40 to 60 being driven in spaces where no humans are present, the operating condition monitoring unit 36b generates a command to stop these facility devices 40 to 60 and delivers this command to the power consumption fluctuation unit 36a.

(3-6-3) Area Information Acquisition Unit

The area information acquisition unit 36c acquires the information detected by the human detection sensors at a predetermined timing. Specifically, when a new state is detected by a human detection sensor, the area information acquisition unit 36c acquires information indicating this from the human detection sensor. The area information acquisition unit 36c stores the acquired information in the aforementioned area information storage section 35a. The area information acquisition unit 36c continuously acquires information at a predetermined timing even during demand-response control.

(3-6-4) Receiving Unit

The receiving unit 36d receives the demand sent from the energy management apparatus 10. The demand received by the receiving unit 36d is stored in the aforementioned demand storage section 35c.

(3-6-5) Flag-Switching Unit

The flag-switching unit 36e switches the state of the flag between ON and OFF on the basis of whether or not the time is within the adjustment time span. Specifically, the flag-switching unit 36e switches the state of the flag to ON when the demand is received by the receiving unit 36d. Furthermore, the flag-switching unit 36e switches the state of the flag to OFF when the adjustment time span ends. The state of the flag is stored in the aforementioned storage unit 35.

(3-6-6) Fluctuation-Amount-Estimation Unit

The fluctuation-amount-estimation unit 36f estimates the amount of fluctuation in power consumption when a command relating to non-demand-response control is received at or after the starting time of the adjustment time span. The fluctuation amount includes the progress of power consumption which fluctuates when non-demand-response control is implemented, and the power consumption difference.

Figure 7:
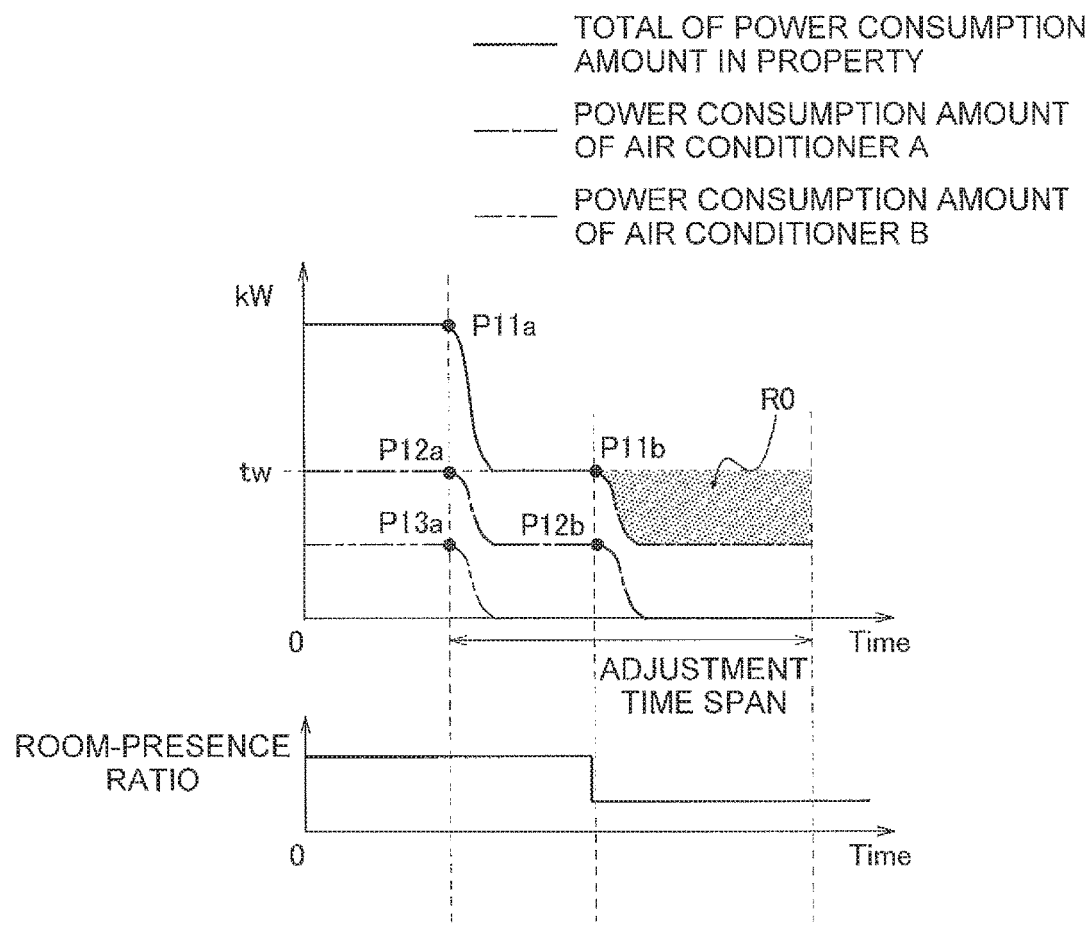
FIG. 7 is a drawing showing the change in power consumption when adjustment control is not performed.

The progress of power consumption, which fluctuates due to the execution of the command relating to non-demand-response control, is the total value of power consumption in the property 2, which changes with the elapse of time when non-demand-response control has been executed (refer to the line extending prior to point P11b in FIG. 7). In other words, power consumption amounts at a plurality of times after non-demand-response control is executed are estimated as the progress of power consumption. The progress of power consumption is estimated with the response speeds (kwh/sec) of the facility devices 40 to 60 taken into account.

The power consumption difference is an estimated value of power consumption when non-demand-response control has been executed, this power consumption having fluctuated relative to the power consumption before the executing of non-demand-response control (refer to section R0 in FIG. 7). Specifically, the power consumption difference is the difference between the power consumption per unit time before the execution of non-demand-response control, and the power consumption per unit time after the execution of non-demand-response control, as described above.

More specifically, the fluctuation-amount-estimation unit 36f calculates the fluctuation amount on the basis of the time length from the time when non-demand-response control is started until the ending time of the adjustment time span, and the basic information stored in the basic information storage section 35d. In other words, the fluctuation-amount-estimation unit 36f refers to the basic information of the facility devices 40 to 60 that are the objective of non-demand-response control, and estimates the power consumption that will fluctuate from the time when non-demand-response control is started until the ending time of the adjustment time span. The progress of power consumption and the power consumption difference obtained by the fluctuation-amount-estimation unit 36f are stored in the aforementioned fluctuation amount storage section 35e.

(3-6-7) Adjustment Control Deciding Unit

The adjustment control deciding unit 36g decides the control (adjustment control) for adjusting the power consumption in the adjustment time span so that the power consumption will coincide with the target power consumption tw. Specifically, the adjustment control deciding unit 36g decides the control for adjusting the total power consumption by driving the facility devices other than those relating to non-demand-response control, so that the total power consumption in the property 2 will coincide with the target power consumption even when non-demand-response control has been executed during the adjustment tune span.

Upon receiving a command relating to non-demand-response control during the adjustment time span, the adjustment control deciding unit 36g decides the control for compensating for the fluctuation in power consumption which occurs when the non-demand-response control has been executed. Specifically, the adjustment control deciding unit 36g increases the total power consumption through adjustment control when the total power consumption is reduced by non-demand-response control. The adjustment control deciding unit 36g also reduces the total power consumption through adjustment control when the total power consumption has been increased by non-demand-response control. The adjustment control deciding unit 36g decides which facility devices 40 to 60 will be driven from among the facility devices 40 to 60 that are not driven by non-demand-response control, so that the power consumption relating to adjustment control increases or decreases in conformity with the speed at which the total power consumption is increased or decreased by non-demand-response control.

The adjustment control deciding unit 36g executes adjustment control on the basis of the power consumption progress and power consumption difference stored in the fluctuation amount storage section 35e, and the basic information stored in the basic information storage section 35d. More specifically, the adjustment control deciding unit 36g decides which facility will be driven from among the facility devices other than those driven by non-demand-response control, on the basis of the power fluctuation characteristics of the facility devices driven by non-demand-response control and the power consumption per unit time. Specifically, the adjustment control deciding unit 36g decides, as the adjustment control, the types of facility devices 40 to 60 to be driven, the timing at which the facility devices 40 to 60 will be driven, the drive time of the facility devices 40 to 60, the operating capabilities (%) during driving, and other factors, on the basis of the specifics of non-demand-response control executed during the adjustment time span. Upon deciding adjustment control, the adjustment control deciding unit 36g stores the information pertaining to adjustment control in the aforementioned adjustment control storage section 35f.

(3-6-8) Adjustment Control Execution Unit

The adjustment control execution unit 36h executes adjustment control on the basis of the information stored in the adjustment control storage section 35f. Adjustment control is, as described above, control for driving facility devices not relating to non-demand-response control and adjusting power consumption, so that the total power consumption in the property 2 coincides with the target power consumption tw even when non-demand-response control has been executed during the adjustment time span. The adjustment control execution unit 36h executes adjustment control in conformity with the timing at which non-demand-response control is executed during the adjustment time span.

(3-6-9) Demand-response Unit

The demand-response unit 36i executes demand-response control. Demand-response control is control for adjusting the power consumption of the facility devices 40 to 60 on the basis of the demand. In other words, the demand-response unit 36i controls the facility devices 40 to 60 so as to satisfy the conditions stipulated by the demand.

Specifically, the demand-response unit 36i starts demand-response control when the time stipulated by the demand (the starting time of the adjustment time span). In demand-response control, the facility devices 40 to 60 are controlled so that the total amount of power consumption per unit time of the facility devices 40 to 60 installed in the property 2 coincides with the target power consumption tw stipulated by the demand.

In demand-response control, which of the facility devices 40 to 60 to actuate and at which magnitude of an operating capability to actuate the respective facility devices 40 to 60 may be decided in any manner. For example, the operating capability of the driven air conditioner 40 may be lowered uniformly, and facility devices may be stopped which have a lower priority order on the basis of the priority order established in advance for the facility devices 40 to 60.

(4) Flow of Process in Control Apparatus

Figure 5:
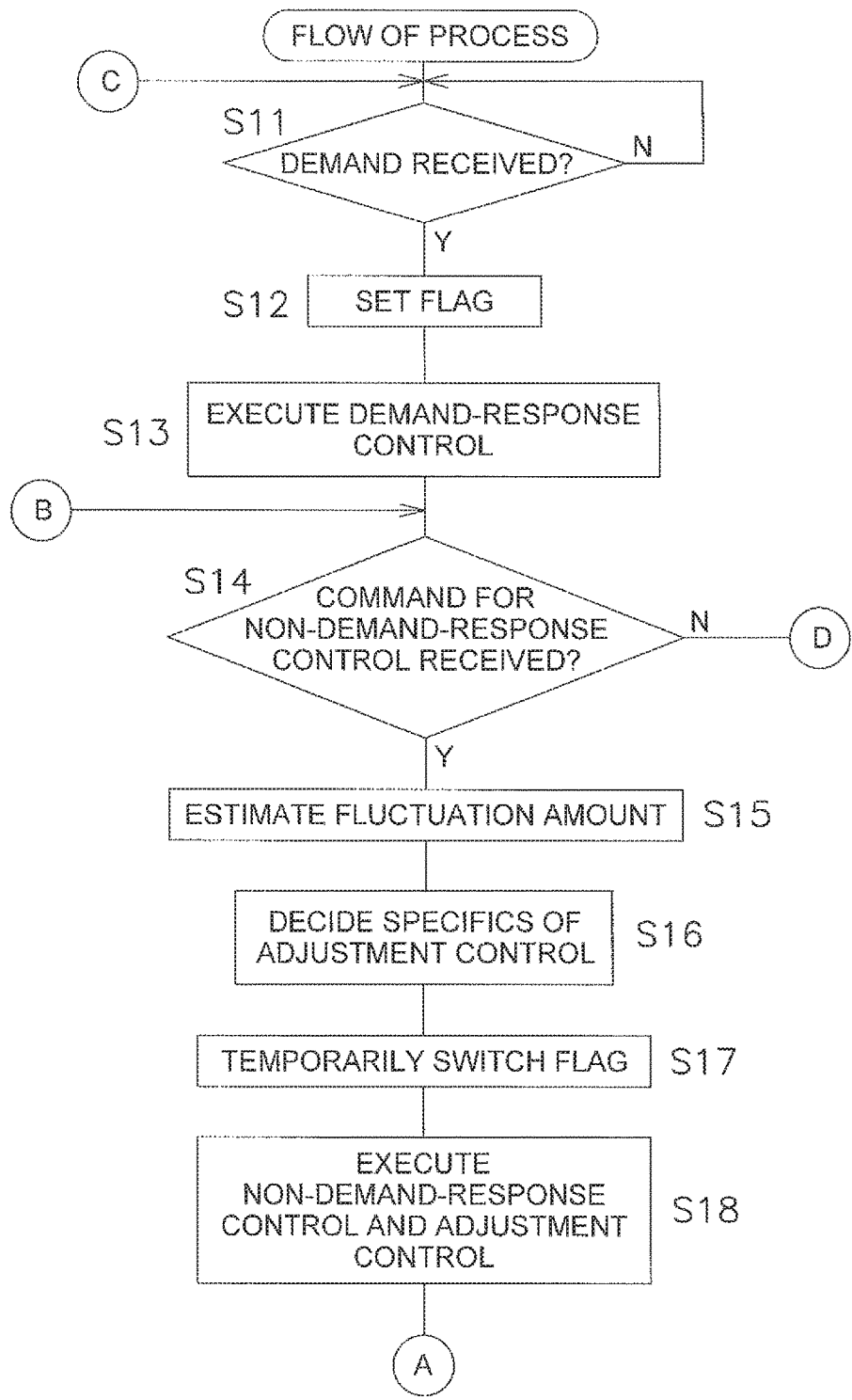
FIG. 5 is a drawing showing the flow of the process of the control apparatus relating to the embodiment of the present invention.
Figure 6:
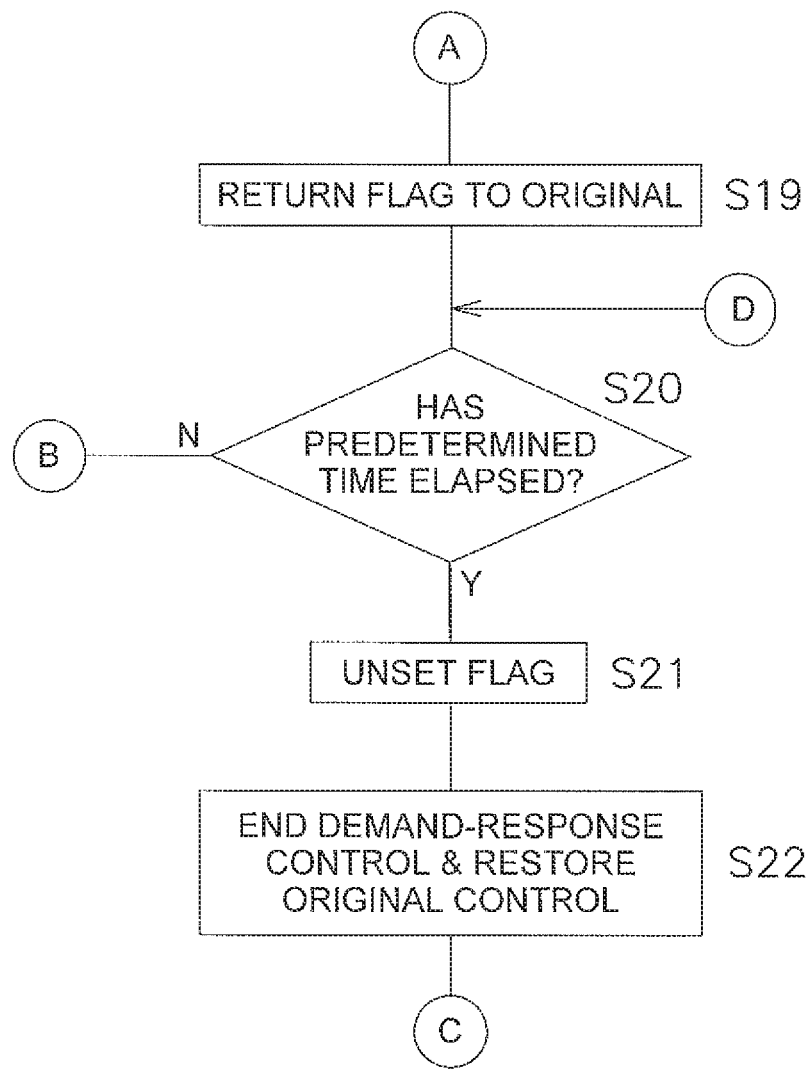
FIG. 6 is a drawing showing the flow of the process of the control apparatus according to the embodiment of the present invention.

Next, FIGS. 5 and 6 are used to describe the flow of the process relating to the demand in the control apparatus 30. The control apparatus 30 suitably executes non-demand-response control until a demand is received. Specifically, the control apparatus 30 implements energy conservation control, schedule control, and manual control immediately upon the generation of commands, until demand-response control is started.

First, in step S12, an assessment is made as to whether or not a demand has been received by the receiving unit 36d. In step S11, the system waits until a demand is received, and after a demand is received, the demand is stored in the demand storage section 35c and the process advances to step S12.

In step S12, the flag is switched from OFF to ON by the flag-switching unit 36e. Specifically, in step S12, the flag-switching unit 36e sets a flag. The switching of the flag by the flag-switching unit 36e is performed at the starting time of the adjustment time span. The process then advances to step S13.

In step S13, demand-response control is executed by the demand-response unit 36i. The demand-response unit 36i controls the facility devices 40 to 60 on the basis of the demand stored in the demand storage section 35c. Specifically, the demand-response unit 36i controls the facility devices 40 to 60 so that in the time span stipulated by the demand, the total amount of power consumption of the facility devices 40 to 60 in the property 2 (the total power consumption) coincides with the target power consumption tw stipulated by the demand. The process then advances to step S14.

In step S14, a determination is made as to whether or not a command for non-demand-response control has been received. When a command for non-demand-response control is not received in step S14, the process advances to step S20. When a command for non-demand-response control is received in step S14, the process advances to step S15. In step S15, the fluctuation amount is estimated by the fluctuation-amount-estimation unit 36f. The fluctuation amount includes the progress of power consumption that fluctuates due to non-demand-response control, and the power consumption difference, as described above. The estimated fluctuation amount is stored in the fluctuation amount storage section 35e. The process then advances to step S16.

In step S16, the specifics of adjustment control are decided by the adjustment control deciding unit 36g. Specifically, the adjustment control deciding unit 36g decides the specifics of the control for adjusting the total power consumption by driving the facility devices other than those relating to non-demand-response control, so that the total power consumption will coincide with the target power consumption tw even when non-demand-response control has been executed during the adjustment time span. When the specifics of adjustment control are decided, the specifics of adjustment control are stored in the adjustment control storage section 35f. The process then advances to step S17.

In step S17, the flag is temporarily switched from ON to OFF by the flag-switching unit 36e. Specifically, the flag is unset in step S17. The process then advances to step S18.

In step S18, non-demand-response control is executed by the power consumption fluctuation unit 36a, and adjustment control is executed by the adjustment control execution unit 36h. The process then advances to step S19.

In step S19, the flag is switched from OH to ON by the flag-switching unit 36e. Specifically, the flag is set in step S19. The process then advances to step S20.

In step S20, a determination is made as to whether or not a predetermined time duration has elapsed, on the basis of the information obtained from the time management unit 32. In other words, in step S20, a determination is made as to whether or not the ending time of the adjustment time period has arrived. When the predetermined time duration has not elapsed in step S20, the process returns to step S14, and when the predetermined time duration has elapsed, the process advances to step S21.

In step S21, the flag is switched from ON to OFF by the flag-switching unit 36e. Specifically, the flag-switching unit 36e unsets the flag in step S21, The process then advances to step S22, In step S22, demand-response control is ended, and the control prior to the start of demand-response control is restored in the facility devices 40 to 60 on the basis of the information stored in the operating condition storage section 35b. The process then returns to step S11.

(5) Characteristics (5-1)

The control apparatus 30 according to the above embodiment comprises the receiving unit 36d, the demand-response unit 36i, the power consumption fluctuation unit 36a, the fluctuation-amount-estimation unit 36f, and the adjustment control execution unit 36h. The receiving unit 36d receives a demand pertaining to power consumption sent from the energy management apparatus 10. When the demand is received by the receiving unit 36d, the demand-response unit 36i executes demand-response control in accordance with the demand. Demand-response control is control for adjusting the total power consumption of the plurality of facility devices 40 to 60 set up in the property 2. The power consumption fluctuation unit 36a executes non-demand-response control. Non-demand-response control involves causing the total power consumption to fluctuate regardless of the demand. The fluctuation-amount-estimation unit 36f estimates the power consumption caused to fluctuate by non-demand-response control during the execution of demand-response control. The adjustment control execution unit 36h executes adjustment control. Adjustment control involves adjusting the power consumption of any number of facility devices 40 to 60 of the plurality of facility devices 40 to 60, on the basis of the estimated fluctuation amount. The estimated fluctuation amount is the amount of fluctuation in power consumption as estimated by the fluctuation-amount-estimation unit 36f.

The energy management system 100 according to the above embodiment is a system constructed between the power company 1 and the properties 2 to which power is supplied from the power company 1. In the energy management system 100, the energy management apparatus 10 installed in the power company 1 and the control apparatuses 30 installed in the properties 2 are connected via the internet 80a, and are configured so that information can be transferred.

The control apparatuses 30 in the properties 2 are used to control the facility devices 40 to 60 installed in the properties 2. The control apparatuses 30 execute control of the facility devices 40 to 60 (non-demand-response control) on the basis of the presence/absence of humans, and/or a schedule or the like set by the user. The energy management system 100 is configured such that information is periodically transmitted from the control apparatuses 30 to the energy management apparatus 10. The power company 1 ascertains the total amount of power consumed in all of the managed properties 2, 2, on the basis of the information periodically sent from the control apparatuses 30 set up in the properties 2.

In the energy management system 100, a demand-response contract is made by the power company 1 and the properties 2 as described above. The demand-response contract is a contract promising that due to demand-compliant control (demand-response control) being consistent in the properties 2, a predetermined incentive (e.g., a tee or a discount) will be paid out from the power company 1 to the properties 2. Under the demand-response contract, when demand-compliant control could not be consistent in the properties 2, the properties 2 are subjected to, e.g., an additional fee, a forfeit payment, or another penalty. The demand is a request to control the facility devices 40 to 60 on the basis of predetermined conditions, and in the above embodiment, the predetermined conditions include the target power consumption tw and a time span (adjustment time span) for driving the facility devices 40 to 60 in the range of the target power consumption tw. Due to the properties 2 controlling the facility devices 40 to 60 in compliance with the demand-response contract, the power company 1 can adjust the total amount of power consumed by the energy management system 100 overall.

The facility devices 40 to 60 in the properties 2 can he controlled regardless of the demand sent from the power company 1 in order to create a comfortable environment in the spaces in the properties 2. Specifically, the control apparatus 30 executes control (non-demand-response control) of the facility devices 40 to 60 according to the needs of the properties 2. During the adjustment time span, the control apparatuses 30 control the facility devices 40 to 60 in accordance with the demand in order to uphold the demand-response contract in the properties 2.

When non-demand-response control is executed in the properties 2 during demand-response control, cases arise in which the conditions of the total power consumption stipulated by the demand cannot be met. For example, cases arise in which the state of the space (the state of presence/absence) in a property 2 changes during the adjustment time span, as shown in FIG. 7. For example, in this case, the property 2 includes spaces A, B, an air conditioner A is set up in space A, and an air conditioner B is set up in space B. During the adjustment time span, the operating capability of the air conditioner A is lowered (refer to point P12a), and the air conditioner B is stopped (refer to point P13a). The total of the power consumption in the property 2 is thereby reduced from the value indicated at point P11a toward the target power consumption tw.

When, for example, the state of space A changes to an absence state during the adjustment time span, the air conditioner A set up in space A is stopped (refer to point P12b, non-demand-response control). The total of the power consumption in the property 2 and the target power consumption tw would then cease to coincide (refer to point Pub). In other words, in the graph of FIG. 7, the power consumption in the colored portion (section R0) would fall short of the target power consumption tw. As a result, the property 2 would no longer be able to achieve the incentive.

Figure 8:
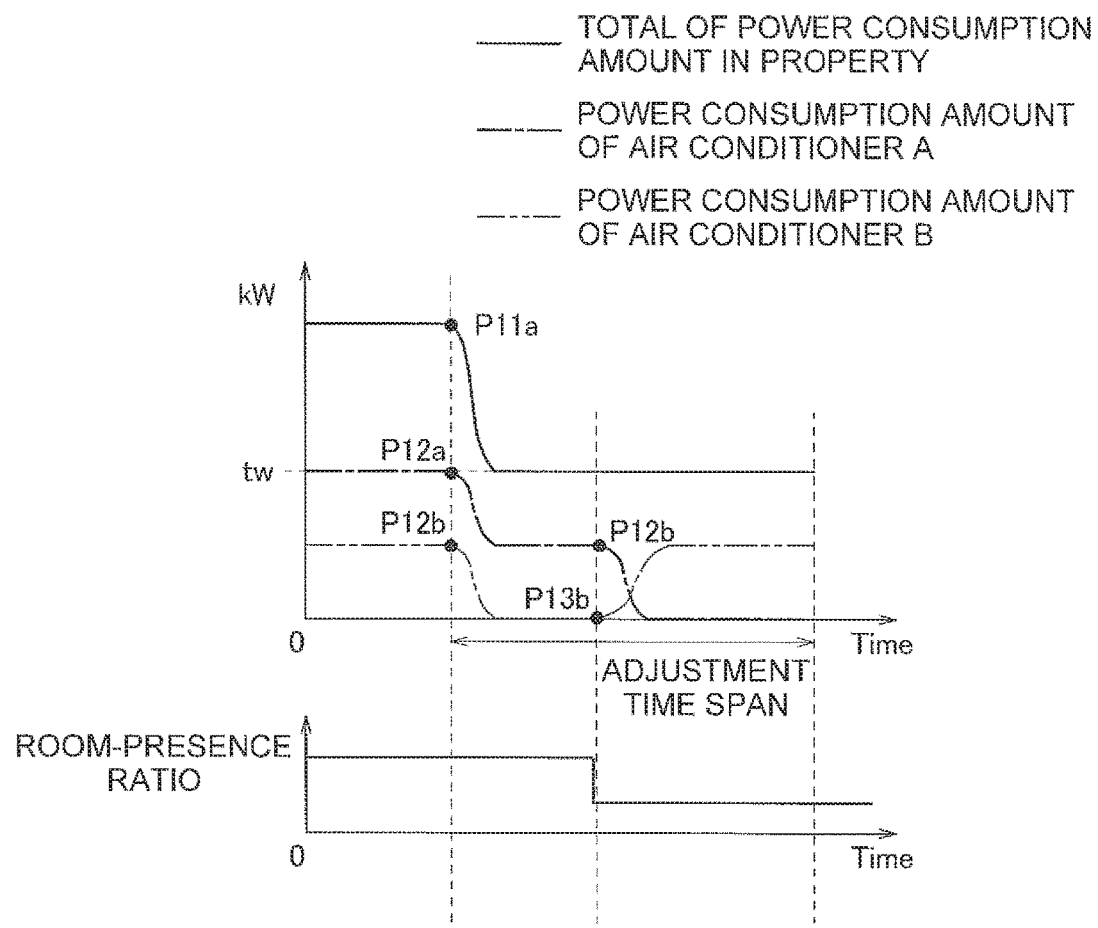
FIG. 8 is a drawing for illustrating the process of the control apparatus according to the embodiment of the present invention.

However, in the control apparatus 30 according to the above embodiment, when a command according to non-demand-response control is generated during the execution of demand-response control, the power consumption that will fluctuate due to non-demand-response control is estimated. On the basis of the estimated fluctuating power consumption (estimated fluctuation amount), the specifics of adjustment control are decided, in which the power consumption of any number of facility devices 40 to 60 of the plurality of facility devices 40 to 60 are adjusted. That is, the power consumption of the air conditioner B is adjusted with the fluctuation in the power consumption of the air conditioner A taken into account, as shown in FIG. 8. Specifically, when the power consumption of the air conditioner A decreases as indicated at point P12b, the power consumption of the air conditioner B increases as indicated at point P13b. As a result, the total of the power consumption in the property 2 during the adjustment time span is maintained so as to coincide with the target power consumption. The facility devices 40 to 60 can thus be effectively controlled by the control apparatus 30 even during demand-response control. As a result, decreases in the incentive can be curbed.

(5-2)

The control apparatus 30 according to the above embodiment further comprises the storage unit 35. The storage unit 35 stores power fluctuation characteristics for each of the plurality of facility devices 40 to 60. On the basis of the power fluctuation characteristics, the adjustment control execution unit 36h executes adjustment control on any number of facility devices 40 to 60 of the plurality of facility devices 40 to 60.

When non-demand-response control is executed, the facility devices 40 to 60 relating to non-demand-response control are driven. In the control apparatus 30 according to the above embodiment, the non-driven devices 40 to 60 are controlled so that the power consumption fluctuating due to non-demand-response control is compensated by the control of the facility devices (non-driven devices) 40 to 60 that are not the objective of non-demand-response control.

When the non-driven devices 40 to 60 are driven while taking into account only the final fluctuation amount in power consumption resulting from non-demand-response control, there are cases in which the total power consumption temporarily deviates from the target power consumption tw. Specifically, when there is a large difference between the power fluctuation characteristics of facility devices 40 to 60 that are driven by non-demand-response control and the power fluctuation characteristics of facility devices 40 to 60 that are driven by adjustment control, the total amount of power consumption in the property 2 cannot be maintained at the target power consumption.

In the control apparatus 30 according to the above embodiment, the basic information storage section 35d stores response speeds as power fluctuation characteristics of the facility devices 40 to 60. On the basis of the response speeds of the facility devices 40 to 60 that are driven by non-demand-response control, the adjustment control deciding unit 36g selects facility devices 40 to 60 to be driven by adjustment control from among the plurality of facility devices 40 to 60. That is, when the facility devices 40 to 60 driven by non-demand-response control have slow response speeds, adjustment control consists of making the total amount of power consumption in the property 2 coincide with the target power consumption by a solution such as selecting facility devices 40 to 60 having a similar or coinciding response speed (see FIG. 8). It is thereby possible to suitably adapt to fluctuations in power consumption during demand-response control.

(5-3)

In the control apparatus 30 according to the above embodiment, at least one of energy conservation control, schedule control, and manual control is executed as non-demand-response control. Energy conservation control is control based on the amount of solar radiation or the presence/absence of humans in the spaces where the facility devices 40 to 60 are set up. Optimal control of the facility devices 40 to 60 depending on the situation can thereby be performed.

(6) Modifications (6-1) Modification 1A

In the control apparatus 30 according to the above embodiment, the adjustment control execution unit 36h executes adjustment control on any number of facility devices 40 to 60 of the plurality of facility devices 40 to 60 on the basis of the power fluctuation characteristics. Specifically, the adjustment control deciding unit 36g selects facility devices 40 to 60 having similar or coinciding response speeds on the basis of the response speeds of the facility devices 40 to 60 to be driven by non-demand-response control, and causes these devices to be driven by adjustment control.

The adjustment control deciding unit 36g herein may adjust power consumption not by selecting facility devices 40 to 60 having similar or coinciding response speeds, but by executing adjustment control with a time difference on any number of facility devices 40 to 60 of the plurality of facility devices 40 to 60. For example, the number of facility devices 40 to 60 to be driven or stopped may be gradually increased in conformity with the speed at which power consumption is increased or reduced by non-demand-response control.

Figure 9:
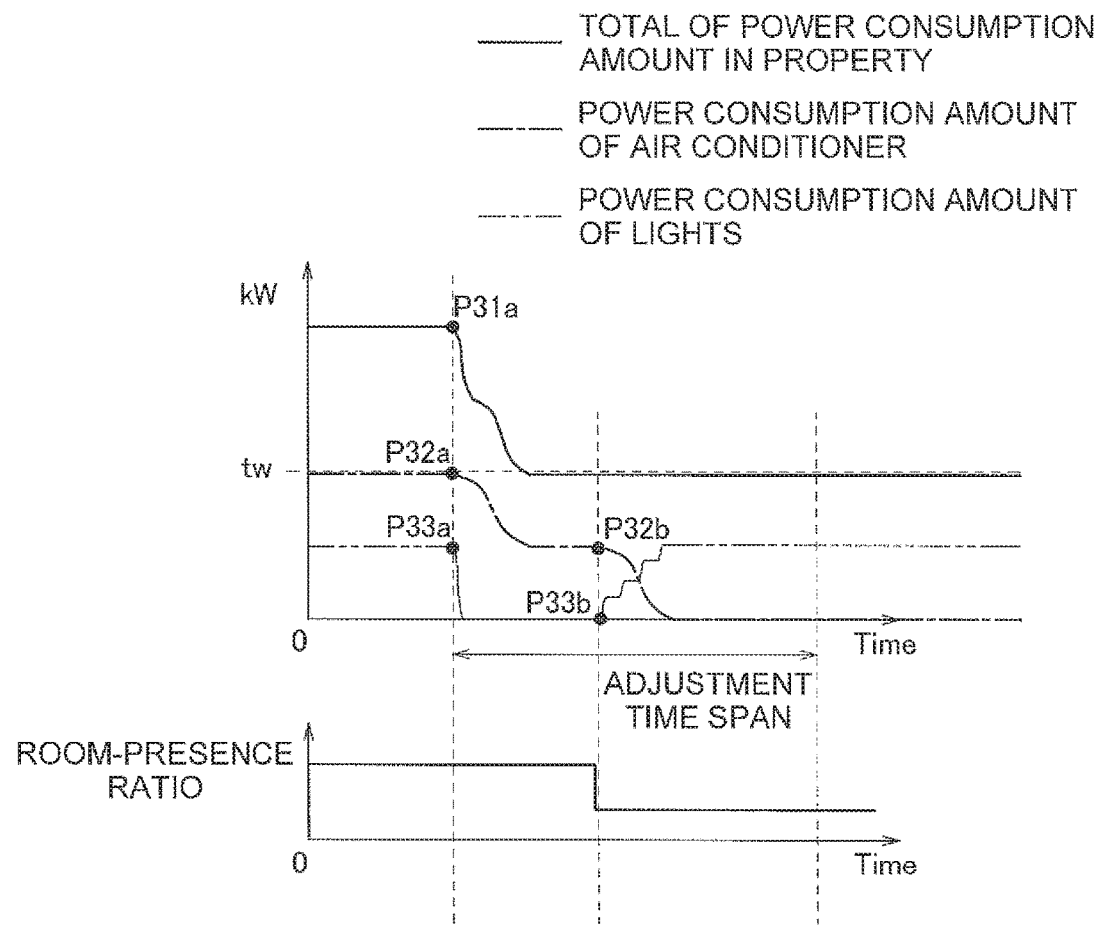
FIG. 9 is a drawing for illustrating the process of the control apparatus according to the embodiment of the present invention.

Specifically. FIG. 9 is used to give a description. In FIG. 9, the property 2 is assumed to include space A and space B, with an air conditioner 40 set up in space A, and a plurality of lights 50 set up in space B. FIG. 9 shows a case in which the room-presence ratio decreases in the adjustment time span. As a result of the state of space A changing from one of human presence to one of human absence, the room-presence ratio changes.

In FIG. 9, when the adjustment time span arrives, the power consumption of the air conditioner 40 is reduced (refer to point P32a), and the lights 50 are switched to OFF (refer to point P33a). As a result, the total amount of power consumption in the property 2 decreases toward the target power consumption tw (refer to point P31a). The state of space A then changes from one of human presence to one of human absence during the adjustment time. As a result, the power consumption of the air conditioner 40 falls toward 0 (refer to point P32b). The plurality of lights 50 set up in space B herein are gradually (with a time difference) switched to ON in conformity with the fluctuation in the power consumption of the air conditioner 40.

Specifically, the adjustment control deciding unit 36g decides that the plurality of facility devices not being driven by non-demand-response control will be controlled so that the timings at which they are switched to ON or OFF are staggered. The power consumption of other facility devices (the lights 50 in this case) can thereby be increased or reduced so as to conform with the speed of increase or decrease in the power consumption of the air conditioner 40. As a result, the total amount of power consumption in the property 2 can be suitably adjusted even in cases such as when the power consumption in the adjustment time span gradually fluctuates due to non-demand-response control.

(6-2) Modification 1B Furthermore, in the control apparatus 30 according to the above embodiment, the adjustment control deciding unit 36g may be configured so as to select facility devices having predetermined power fluctuation characteristics such that their power consumptions, which change stepwise in non-demand-response control, can be balanced out.

Figure 10:
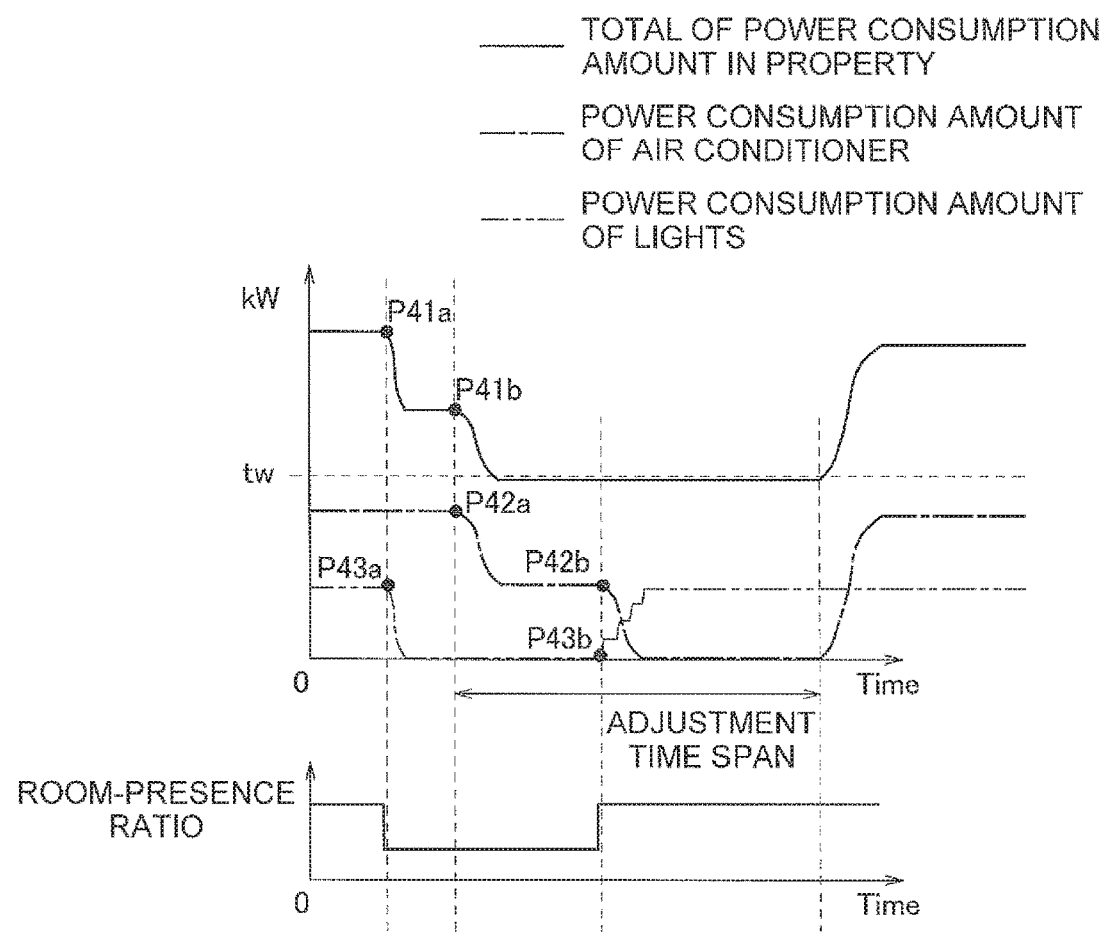
FIG. 10 is a drawing for illustrating the process of the control apparatus according to the embodiment of the present invention.

Specifically, FIG. 10 is used as an example for this description. In FIG. 10 as well, the property 2 is assumed to include space A and space B, with an air conditioner 40 set up in space A, and a plurality of lights 50 set up in space B.

FIG. 10 shows a case in which the room-presence ratio increases during the adjustment time span. That is, in FIG. 10, the state of a certain space changes from one of human presence to one of human absence.

In the example of FIG. 10, first, the room-presence ratio changes before the adjustment time span. Specifically, the state of space B changes from one of human presence to one of human absence. As a result, the lights 50 are switched to OFF (refer to point P43a). As a result, the total amount of power consumption in the property 2 falls from point P41a toward point P41b. When the adjustment time span then arrives, the power consumption of the air conditioner 40 is reduced (refer to point P42a). As a result, the total amount of power consumption in the property 2 further decreases toward the target power consumption tw (refer to point P41*b*). The state of space B then changes from one of human absence to one of human presence within the adjustment time span. As a result, the power consumption of the lights 50 increases stepwise (refer to point P43*b*), and the power consumption of the air conditioner 40 is further reduced (refer to point P42*b*) in conformity with the increase in the power consumption of the lights 50.

When the power consumption of a plurality of facility devices the lights 50 in this case) gradually increases due to non-demand-response control, the adjustment control deciding unit 36*g* adjusts the total power consumption by changing the control specifics of the facility devices (the air conditioner 40 in this case) not being driven by non-demand-response control. That is, the power consumption of the air conditioner 40 is changed in accordance with the rate of increase in the power consumption of the plurality of lights 50.

The facility devices other than those being driven by non-demand-response control are thereby driven at appropriate timings with respect to the power consumption gradually fluctuating due to non-demand-response control, whereby the total amount of power consumption in the property 2 can be suitably adjusted.

(6-3) Modification 1C

In the energy management system 100 as described in the above embodiment, a demand is sent from the energy management apparatus 10 to the control apparatuses 30.

The demand herein may be created on the basis of multiple pieces of suppression possibility information presented to the power company 1 by the properties 2. The suppression possibility information, which is information pertaining to the amount of power that can be suppressed in the properties 2, includes an energy suppression possibility amount and the length of time that the energy suppression possibility amount can be continued (the length of a suppression possibility time). That is, the suppression possibility information is information for requesting that it be possible to suppress the total amount of power consumed in the properties 2. In the power company 1, the energy management apparatus 10 selects the preferred suppression possibility information as a combination of the power consumption of all the properties being managed from the multiple pieces of suppression possibility information sent from the control apparatuses 30 of the properties 2, and the energy management apparatus 10 creates a demand to send to the properties 2 on the basis of the selected suppression possibility information.

In the energy management apparatus 10, the power amount that had been planned is thereby consumed in the properties 2, and energy can therefore be managed in a suitable manner throughout the entire energy management system 100.

(6-4) Modification 1D

In the above embodiment, non-demand-response control includes energy conservation control, schedule control, manual control, and the like. Energy conservation control is control based on the presence/absence of humans in the spaces in which the facility devices are set up. Energy conservation control may include control based on external factors. Control based on external factors means control for changing the operating specifics (set temperature, airflow quantity, illuminance, etc.) of the facility devices 40 to 60 on the basis of, e.g., how great or small is the amount of solar radiation in the spaces in the property 2.

In this case, apparatuses for measuring the amount of solar radiation would be set up in the spaces included in the property 2, and information pertaining to the amount of solar radiation would be stored in the area information storage section 35*a*. The basic information storage section 35*d* would also store the operating capability and/or operating state corresponding to the amount of solar radiation for each of the facility devices 40 to 60.

It would thereby be possible to improve the energy conservation effect by controlling the facility devices 40 to 60 in a manner suited to spaces having a greater amount of solar radiation and spaces having a lesser amount of solar radiation.

What is claimed is:

1. A control apparatus, comprising:
an information storage that stores response speeds of each of a plurality of facility devices set up in a property, the response speeds being expressed as power consumption per unit time; and
a controller including a processor and configured to execute a stored program to
receive a demand pertaining to power consumption sent from an energy management apparatus;
execute a demand-response control in order to adjust a total power consumption of the plurality of facility devices to a target power consumption set in accordance with the demand;
receive a command to execute a non-demand-response control with respect to at least one of the facility devices regardless of the demand, the non-demand-response control causing the total power consumption to deviate from the target power consumption;
estimate a fluctuation amount by which the total power consumption will deviate from the target power consumption due to execution of the non-demand-response control during the demand-response control, the estimation of the fluctuation amount being made before the non-demand response control is executed;
decide an adjustment control before the non-demand response control is executed in order to adjust power consumption of any facility device among the plurality of facility devices other than the at least one of the facility devices subjected to the non-demand-response control, the adjustment control being based on the fluctuation amount so that the total power consumption will coincide with the target power consumption, the controller selecting the any facility device other than the at least one of the facility devices such that the selected facility device has a similar or coinciding response speed to the at least one of the facility devices; and
execute the non-demand response control and the adjustment control after the fluctuation amount has been estimated and the adjustment control has been decided,
the controller being configured not to execute the non-demand-response control unless the adjustment control has been decided.

2. The control apparatus according to claim 1, wherein the controller is further configured to execute the adjustment control with a time difference on some facility devices of the plurality of facility devices.

3. The control apparatus according to claim 1, wherein the non-demand-response control includes at least one of a schedule control, a manual control, and an energy conservation control, and the energy conservation control is based on either
- a presence/absence of humans in the spaces where the facility devices are set up or
- an amount of solar radiation in the spaces where the facility devices are set up.

4. The control apparatus according to claim 1, wherein the controller is further configured to execute the adjustment control with a time difference on some facility devices of the plurality of facility devices.

5. The control apparatus according to claim 4, wherein the non-demand-response control includes at least one of a schedule control, a manual control, and an energy conservation control, and
the energy conservation control is based on either
- a presence/absence of humans in the spaces where the facility devices are set up or
- an amount of solar radiation in the spaces where the facility devices are set up.

6. The control apparatus according to claim 1, wherein the non-demand-response control includes at least one of a schedule control, a manual control, and an energy conservation control, and
the energy conservation control is based on either
- a presence/absence of humans in the spaces where the facility devices are set up or
- an amount of solar radiation in the spaces where the facility devices are set up.

7. The control apparatus according to claim 2, wherein the non-demand-response control includes at least one of a schedule control, a manual control, and an energy conservation control, and
the energy conservation control is based on either
- a presence/absence of humans in the spaces where the facility devices are set up or
- an amount of solar radiation in the spaces where the facility devices are set up.

8. The control apparatus according to claim 1, wherein the adjustment control is configured to reduce the total power consumption when the total power consumption is increased by the non-demand-response control, and
the adjustment control is configured to increase the total power consumption when the total power consumption is reduced by the non-demand-response control.

9. The control apparatus according to claim 1, wherein the controller is configured to execute the adjustment control with a time difference on some facility devices of the plurality of facility devices.

10. The control apparatus according to claim 1, wherein the information storage stores a priority order of the facility devices, the priority order stipulating which of the facility devices, other than the at least one of the facility devices, to maintain at the operating state prior to the demand-response control when demand-response control is executed.

* * * * *